United States Patent [19]

Logan

[11] 4,135,209
[45] Jan. 16, 1979

[54] TIME-SHARED SAMPLE AND HOLD CIRCUIT

[75] Inventor: Robert P. Logan, Framingham, Mass.

[73] Assignee: GTE Sylvania Incorporated, Stamford, Conn.

[21] Appl. No.: 774,617

[22] Filed: Mar. 4, 1977

[51] Int. Cl.² .................... H04N 7/02; H04N 9/62
[52] U.S. Cl. ........................... 358/139; 358/10; 358/27; 358/168
[58] Field of Search ............ 358/27, 29, 39, 40, 358/139, 168, 169, 10

[56] References Cited

U.S. PATENT DOCUMENTS

| | | | |
|---|---|---|---|
| 3,659,044 | 4/1972 | Olson | 358/139 |
| 3,792,195 | 2/1974 | Wilson et al. | 358/139 |
| 3,920,891 | 11/1975 | Rhee | 358/188 |

Primary Examiner—Robert L. Griffin
Assistant Examiner—Joseph A. Orsino, Jr.
Attorney, Agent, or Firm—John A. Odozynaki; Theodore D. Lindgren

[57] ABSTRACT

Circuitry implementing at least two amplitude level detectors and a method for monitoring their ability to track rapid changes in signal level is shown. The monitoring circuit uses a delay network to provide an indication that the detectors have not been driven into conduction during a specific interval of time. If this operation persists, a resetting circuit discharges the detector output filter network, thereby allowing the detectors to re-establish an output indicative of the present input signal level. A commutating circuit is shown which allows a single delay network to be used in conjunction with at least two level detectors.

16 Claims, 2 Drawing Figures

TIME-SHARED SAMPLE AND HOLD CIRCUIT

FIELD OF THE INVENTION

This invention relates to amplitude control circuitry in television receivers and more particularly to a time-shared sample and hold system wherein the operation of a plurality of level detectors is monitored and, if a particular operating condition occurs, modified in order to allow them to respond to variations in signal amplitude.

BACKGROUND OF THE INVENTION

Television receivers necessarily include a number of adjustable controls for establishing desired operation and optimizing picture quality. Examples of these are the brightness, contrast, and color controls.

Viewer operated controls, in addition to being a source of inconvenience, are also subject to gross misadjustment, occasionally requiring a service call to re-establish proper operation. To alleviate such problems, it is desirable to incorporate into the design of television receivers automatic control circuits tending to obviate the need for, or at least abate the use of, viewer-operated controls.

U.S. Pat. No. 3,920,891 granted to D. W. Rhee discloses a novel Peak Detector and Sample and Hold Circuit for use with amplitude control circuits. Rhee discloses circuits effecting both positive and negative peak detectors, thereby establishing a method for controlling the amplitudes of signals of either polarity. Rhee's circuit also circumvents the disadvantages attendant a long time-constant in the detector filter circuit. In particular, Rhee employs a sampling circuit to monitor the operation of a peak detector. If the peak detector is not driven into conduction at least once during approximately three vertical fields, an indication that it has not followed a change in input signal level, the detector filter network is discharged. This allows the detector to re-charge the output filter network to a level approximately equal to the peak amplitude of the input signal.

The Peak Detector and Sample and Hold Circuit disclosed in Rhee can be implemented almost entirely with integrated circuit techniques. However, the sampling circuit which monitors the operation of the peak detector requires a relatively large value capacitance, not readily realizable in integrated circuit form. Therefore, each Peak Detector and Sample and Hold Circuit included in an integrated circuit package requires two individual external capacitors, one in the detector filter circuit and one to establish the sampling time delay.

Because there is a limit to the number of pins that can be provided on an integrated circuit package at a given price and because the capacitor itself is a relatively expensive component, it is desirable to minimize the number of external capacitors required. The circuitry of this invention allows a plurality of peak detectors to be monitored with a single time delay capacitor.

OBJECTS OF THE INVENTION

Accordingly, it is a primary object of this invention to provide a time-shared sample and hold circuit capable of operating with a plurality of gain-controlled stages.

It is a further object of this invention to provide a time-shared sample and hold circuit amenable to fabrication in integrated circuit form.

It is a further object of this invention to provide a time-shared sample and hold circuit in integrated circuit form requiring a minimal number of external components.

SUMMARY OF THE INVENTION

In one aspect of this invention the above and other objects and advantages are achieved in a time-shared sample and hold circuit for a television receiver having a plurality of amplitude control means. The time-shared sample and hold circuit includes a plurality of level detecting means, a monitoring means, a commutating means, and a resetting means.

The level detecting means are coupled to receive respective signals and connected to the respective amplitude control means for providing an output representative of the amplitude of those signals.

The monitoring means is connected to the level detecting means and provides an output representative of the operation of the level detecting means.

The commutating means is connected to the monitoring means for enabling said monitoring means to alternately monitor the operation of the level detecting means.

The resetting means is connected to the level detecting means, the monitoring means, and the commutating means and resets the selected ones of said level detecting means in response to a prescribed condition at the output of the monitoring means.

DESCRIPTION OF THE PREFERRED EMBODIMENTS

For a better understanding of the present invention, together with other and further objects, advantages and capabilities thereof, reference is made to the following disclosure and appended claims in connection with the above-described drawings.

Figure 1:
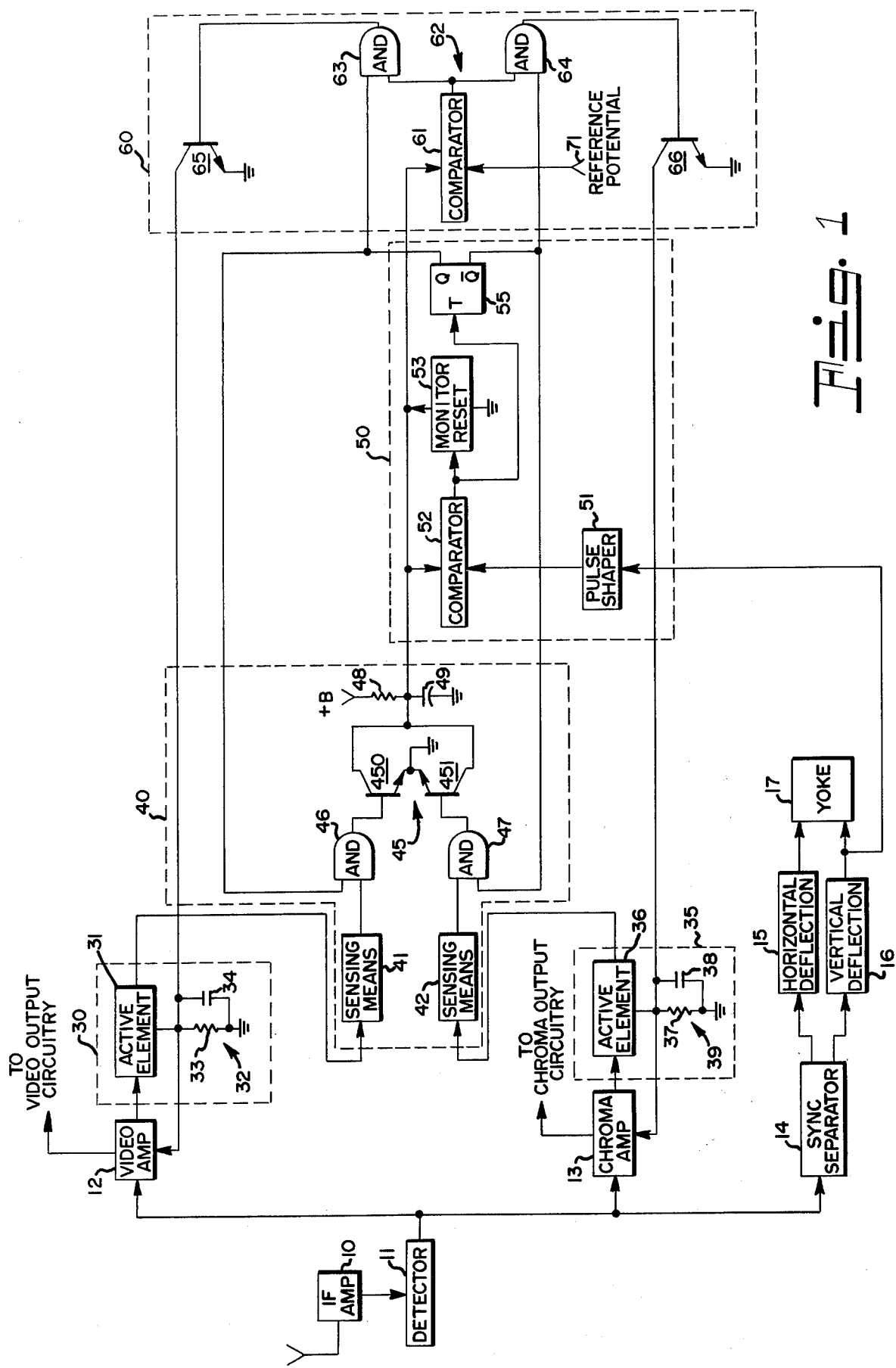
FIG. 1 is a block diagram of a television receiver incorporating a preferred embodiment of the invention.

In FIG. 1 typical television receiver components are illustrated in block form. In a conventional color television receiver, the composite video signal, including luminance, chrominance, and synchronization information remains intact through amplification by an IF amplifier 10 and demodulation by a detector 11. At this point the signals are typically separated into distinct channels for processing by a video amplifier 12 and a chroma amplifier 13. In this embodiment amplifiers 12 and 13 include gain-controlled stages with amplitude control means for maintaining the amplitudes of the respective video and chroma signals at desired levels. Sync separator 14 provides synchronizing pulses to horizontal deflection circuit 15 and vertical deflection circuit 16 which provide suitable deflection signals to a yoke 17.

The outputs of video amplifier 12 and chroma amplifier 13 are coupled to a first level detector 30 and a second level detector 35, respectively. The level detectors provide outputs representative of the amplitudes of the input video and chroma signals. Various level detecting schemes are well known in the prior art and can take the form of positive or negative peak detectors, average detectors, peak-above-a-threshold detectors, etc. Such level detectors typically include an active element, for instance, a diode or transistors, and an output filter network. For the purposes of this description, level detectors 30 and 35 will be considered to be transistor peak detectors as disclosed by Rhee in U.S. Pat. No. 3,920,891; however, those skilled in the art will realize that other forms of level detectors can be used as well.

Peak detector 30 includes an active element 31 and an output filter network 32, including a parallel combination of a resistor 33 and a capacitor 34. Similarly, peak detector 35 includes an active element 36 and an output filter network 37, including a parallel combination of a resistor 38 and a capacitor 39. Peak detectors 30 and 35 provide, to video amplifier 12 and chroma amplifier 13, respectively, control voltages representative of the peak amplitudes of the associated input signals. The output filter networks are characterized by long time constant RC networks.

Peak detectors 30 and 35 are further connected to a monitoring means 40. Monitoring means 40 includes a first sensing means 41 connected to peak detector 30, and a second sensing means 42 connected to peak detector 35. Monitoring means 40 further includes a sampling means illustrated as including a logic circuit comprising a pair of AND gates 46 and 47 connected to the respective outputs of sensing means 41 and 42. AND gates 46 and 47 are individually enabled by a commutating means 50 and provide an output to a discharge circuit 45, illustrated as including transistors 450 and 451. Discharge circuit 45 is in turn connected to a delay network comprised of a resistive branch 48, connected to a first source of potential, B+, and a capacitive branch 49, connected to a second source of potential illustrated as circuit ground. Monitoring means 40 provides, to both commutating means 50 and a resetting means 60, an output, taken at the junction of resistive branch 48 and capacitive branch 49, representative of the operation of a selected peak detector.

Commutating means 50 includes a binary electronic device 55, illustrated as a flip-flop, having trigger signals provided by an output of a comparator means 52. The output of comparator means 52 is determined by the relative amplitudes of the outputs of monitoring means 50 and a pulse shaper 51. Pulse shaper 51 provides a fixed amplitude output pulse in response to input pulses occuring during vertical retrace. In addition to triggering flip-flop 55 thereby causing it to change state, comparator 52 activates a monitor reset means 53, thereby discharging capacitor 49 and returning the output of the delay circuit to ground potential.

Resetting means 60 is comprised of a comparator circuit 61, a logic circuit 62, illustrated as AND gates 63 and 64, and discharge means illustrated as transistors 65 and 66. Comparator circuit 61 provides an enabling signal, that is, a voltage at logical level ONE, when the output of monitoring means 40 is greater than a reference potential 71. AND gates 63 and 64 also have inputs connected to commutating means 50 and outputs connected to transistors 65 and 66, respectively. When both inputs to either of gates 63 or 64 are enabled, the associated transistor is driven into conduction thereby discharging the detector filter network, 35 or 39, to which it is connected.

Figure 2:
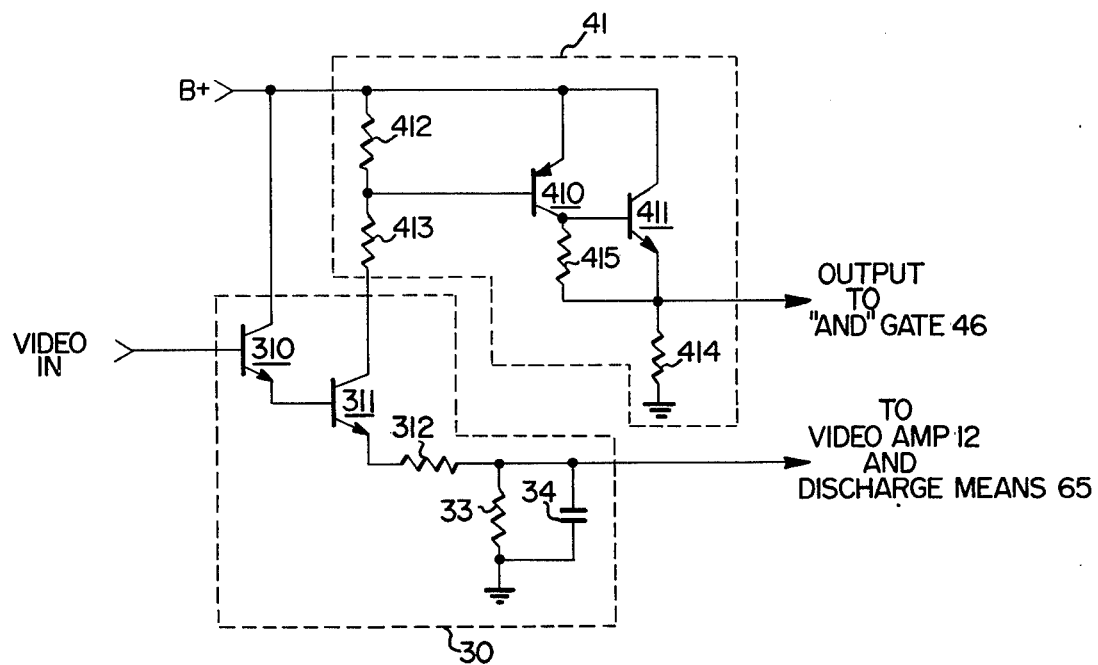
FIG. 2 is a schematic diagram of a peak detector and sensing means of FIG. 1.

FIG. 2 is a detailed schematic of a preferred form of peak detector 30 and sensing means 41. Peak detector 35 and sensing means 42 can be identical in form and function and therefore are not shown.

A positive-going signal at the base of transistor 310 will cause it and transistor 311 to conduct, thereby charging capacitor 34, through resistor 312, to approximately the peak value of the video signal. As transistor 312 conducts, its collector current flows through resistor 413 and the parallel combination of resistor 412 and the base circuit of transistor 410. Collector current of transistor 410 supplies base current to transistor 411 causing it to conduct and develop a logical ONE voltage level across resistor 414. As is easily seen, sensing means 41 will provide a logical ONE output whenever peak detector 30 is conducting. For a given reproduced television image, the peak detector will conduct at the time during a sampling interval, in this case as vertical field, when the peak video level appears in the scene. Because some charge is continually drawn from capacitor 34 through resistor 33, its voltage will delay slightly during the time between peaks in successive sampling intervals. As a result, the detector will conduct at least once during every field, despite a constant peak video level. However, if a reduction in the peak video level occurs, transistors 310 and 311 will not be driven into conduction and the output of filter network 32 will not be able to track the signal level.

Peak detector 35 and sensing means 42 respond in an analogous fashion to the chroma signal.

Below is described the operation by which a time-shared sample and hold circuit allows a plurality of peak detectors, in this case two, to respond rapidly to a reduction in signal level.

At the end of each vertical field, pulse shaper 51 receives an input pulse during retrace and provides a fixed amplitude output pulse of, for example, 2 volts. If the output of monitoring means 40, that is the voltage on capacitor 49, is less than 2 volts, comparator 52 responds with a positive-going output pulse, activating monitor reset 53 and triggering flip-flop 55. Activating monitor reset 53 causes it to discharge capacitor 49, returning its voltage toward ground. Triggering flip-flop 55 causes it to change state, that is have its output complemented.

Assume that at the beginning of a vertical field flip-flop 55 has a Q output at a logical ONE and $\overline{Q}$ at a logical ZERO. Gates 46 and 63 will be enabled and 47 and 64 will be disabled. At the beginning of the field, capacitor 49 begins to charge through resistor 48 toward B+. However, as the peak video level in the scene occurs, peak detector 30 conducts and causes a logical ONE to appear at the output of sensing means 41. With both inputs to gate 46 at a logical ONE, its output goes to a logical ONE, turning on transistor 450 of discharge means 45, and again discharging capacitor 49.

At the end of the field, pulse shaper 51 receives another input pulse and, because the output of monitor means 40 is less than two volts, reset means 53 is again activated and flip-flop 55 is triggered, enabling gates 47 and 64. During the subsequent vertical field, the operation of monitor means 40 is determined by the amplitude of the chroma signal. Assuming normal operation, peak detector 35 will conduct at least once during the sampling interval, at the end of which flip-flop 55 will again be triggered and change state.

Now assume that a change in scene occurs and is accompanied by a reduction in peak video level. The reduced peak signal level will not be of sufficient amplitude to drive peak detector 35 into conduction and, as a result, capacitor 49 will not be discharged during the sampling interval. At the time pulse shaper 51 receives another input pulse, capacitor 49 will have charged beyond two volts and no trigger pulse will be provided to flip-flop 55. Since reset means 53 will not be activated, capacitor 49 will continue to charge toward B+, and gates 47 and 64 will remain enabled. At some time between approximately the next two or three fields, the voltage on capacitor 49 becomes greater than the reference voltage at comparator 61, say seven volts, and the output of comparator 61 goes to a logical ONE. With both inputs to gate 63 at logical ONE, its output becomes a logical ONE, turning on transistor 65 and discharging capacitor 34 of filter network 35. Discharging capacitor 34 allows peak detector 30 to establish a new output level representative of the reduced video level. As the new peak video level occurs, peak detector 30 will conduct and charge the output network 35, up to that level. As peak detector 30 conducts, a logical ONE appears at the output of sensing means 41 causing a logical ONE at the output of gate 46. Discharge means 45 is again activated and the voltage on capacitor 49 is returned to ground.

At the occurrence of the next input pulse to pulse shaper 51 the voltage on capacitor 49 will be less than two volts. Flip-flop 55 will be triggered, monitor reset means will be activated, and gates 47 and 64 will be enabled. At this time the cycle is complete. The circuit has reacted to a reduction in input signal level and commutating means 50 will continue to alternate between the two signal channels until such time as another reduction in either signal level should occur.

Although commutating means 50 is shown to include flip-flop 55, alternate embodiments are clearly feasible. In particular, while flip-flop 55 is capable of only two output conditions, (Q at ONE and $\bar{Q}$ at ZERO) or (Q at ZERO and $\bar{Q}$ at ONE), a binary device capable of N distinct output conditions can accommodate N peak detectors. For instance, flip-flop 55 may be replaced by an N-bit shift register, thereby effecting a circuit capable of accommodating N peak detectors. Similarly, it may be desirable or possible in some application to eliminate the trigger signal by utilizing an astable multivibrator or some other form of free-running oscillator to drive, for instance, a ring-counter.

In the above embodiment the use of a trigger signal derived from the vertical retrace pulse affords significant advantages. By deriving the trigger signal from an accurate external reference, a precise sampling interval can be established with a minimal number of components. Furthermore, establishing the sampling interval to be one vertical field assures that the monitoring circuit has access to an entire scene, thereby precluding the possibility of sampling only some fraction of a scene.

Delaying the activation of resetting means 60 until the output of the delay network reaches the input reference level to comparator 61 improves the reliability of the circuit allowing approximately three successive fields to be monitored before resetting the detector filter network. This has the effect of rendering operation more insensitive to transient aberrations in the transcribed signal.

Furthermore, a system such as this wherein each level detector may be reset and recharged independently of the others is clearly preferable to either one which resets all detectors as a result of the operation of a single detector or one which requires a specific condition to exist in all of the detectors before any are reset.

While there has been shown and described what are at present considered the preferred embodiments of the invention, it will be obvious to those skilled in the art that various changes and modifications may be made therein without departing from the scope of the invention as defined by the appended claims.

What is claimed is:

1. In a television receiver having a plurality of amplitude controlled stages, a time-shared sample and hold circuit comprising:
   a plurality of level detecting means connected to respective ones of said controlled stages for receiving respective signals and for providing outputs representative of the amplitude thereof;
   monitoring means connected to said level detecting means for providing an output representative of the operation thereof;
   resetting means connected to said monitoring means and to said level detecting means for resetting said level detecting means in response to a prescribed operating condition thereof; and
   commutating means connected to said monitoring means and to said resetting means for enabling said monitoring means to alternatively monitor the operation of selected ones of said level detecting means and for providing a signal to said resetting means so that said selected ones of said level detecting means are reset in response to said prescribed operating conditions.

2. A time-shared sample and hold circuit as defined in claim 1 wherein said monitoring means includes a sensing means connected to said level detecting means for providing an output representative of the operation thereof.

3. A time-shared sample and hold circuit as defined in claim 2 wherein said monitoring means further includes a sampling means connected to said sensing means and to said commutating means for providing an output representative of the operation of selected ones of said level detecting means, as determined by the output condition of said commutating means.

4. A time-shared sample and hold circuit as defined in claim 3 wherein said sampling means comprises:
   a logic circuit having inputs connected to said sensing means and said commutating means;
   a discharge circuit having an input connected to an output of said logic circuit; and
   a delay circuit connected to the output of said discharge circuit and to said commutating means.

5. A time-shared sample and hold circuit as defined in claim 4 wherein said logic circuit provides an output representative of selected ones of said level detection means as determined by the output condition of said commutating means.

6. A time-shared sample and hold circuit as defined in claim 5 wherein said discharge circuit includes an electron device rendered conductive in response to the output of said logic circuit.

7. A time-shared sample and hold circuit as defined in claim 4 wherein said delay circuit determines the length of time required for said reset means to respond to said prescribed operating condition of said level detecting means.

8. The time-shared sample and hold circuit as defined in claim 1 wherein said commutating means further includes a pulse shaper connected to a source of input trigger signals for providing a fixed amplitude output pulse;

a comparator means connected to said pulse shaper means and said monitor means for providing an output representative of the relative outputs thereof; and monitor reset means connected to said monitoring means and comparator means for resetting said monitoring means in response to the output of said comparator means.

9. A time-shared sample and hold circuit as defined in claim 8 wherein said commutating means further includes a binary electronic device for providing a plurality of output conditions in response to an input trigger signal.

10. A time-shared sample and hold circuit as defined in claim 9 wherein said commutating means further includes a pulse shaper connected to a source of signals occurring during the vertical retrace period.

11. A time-shared sample and hold circuit as defined in claim 1 wherein said resetting means includes:
comparator means having a first input connected to the output of said monitoring means, a second input connected to a source of potential, and an output responsive to the relative amplitudes of signals present at said inputs;
a logic circuit having inputs connected to the output of said comparator means and said commutating means; and
a plurality of discharge means having inputs connected to the output of said logic circuit and outputs connected to respective areas of said level detecting means.

12. A time-shared sample and hold circuit as defined in claim 11 wherein each of said discharge means includes an electron device rendered conductive in response to the output of said logic circuit.

13. In a television receiver having a plurality of amplitude control means, a time-shared sample and hold circuit comprising:

a plurality of level detecting means, connected to said control means, each coupled to receive a respective signal, for providing an output representative of the amplitude thereof;
a plurality of sensing means connected to respective ones of said level detecting means for providing outputs representative of the operation thereof;
sampling means connected to said sensing means for providing an output representative of selected ones of said sensing means;
a delay circuit connected to the output of said sampling means;
commutating means connected to said sampling means for determining which of said sensing means are sampled to affect the output of said delay circuit; and
resetting means connected to said commutating means, said level detecting means and said delay circuit for resetting selected ones of said level detecting means in response to a prescribed output condition of said delay circuit.

14. The time-shared sample and hold circuit as defined in claim 13 wherein said sampling means includes:
a logic circuit having inputs connected to said sensing means and said commutating means; and
a discharge circuit having a plurality of electron devices rendered conductive in response to the output of said logic circuit.

15. The time-shared sample and hold circuit as defined in claim 14 wherein said delay circuit includes a resistive branch and a reactive branch connected between first and second sources of potential.

16. The time-shared sample and hold circuit as defined in claim 15 wherein said commutating means provides a number of output conditions varying in response to a trigger signal, said trigger signal being disabled in reaction to a prescribed output condition of said delay circuit.

* * * * *